United States Patent [19]

Ciotola

[11] Patent Number: 4,832,351
[45] Date of Patent: May 23, 1989

[54] SELF-ALIGNING SEALING MEANS FOR PUMPS AND OTHER MACHINERY, INCLUDING ROTATING SHAFTS

[76] Inventor: Alfredo A. Ciotola, 1060 Revere Ave., Bronx, N.Y. 10465

[21] Appl. No.: 98,212

[22] Filed: Oct. 26, 1987

[51] Int. Cl.$^4$ ............................................. F16J 15/02
[52] U.S. Cl. ................................................. 277/81 R
[58] Field of Search .................. 277/11, 12, 13, 81 R, 277/81 P, 81 S

[56] References Cited

U.S. PATENT DOCUMENTS

| | | | |
|---|---|---|---|
| 2,362,436 | 11/1944 | Stratford | 277/81 X |
| 2,738,208 | 3/1956 | Mylander | 277/13 |
| 3,020,052 | 2/1962 | Gits | 277/89 |
| 3,042,414 | 7/1962 | Tracy | 277/11 |
| 3,068,801 | 12/1962 | Murray | 103/103 |
| 3,116,066 | 12/1963 | Koppius | 277/81 X |
| 3,218,110 | 11/1965 | Conner | 277/81 X |
| 3,410,565 | 11/1968 | Williams | 277/3 |
| 3,420,535 | 1/1969 | Hershey | 277/92 |
| 3,468,548 | 9/1969 | Webb | 277/13 |
| 3,656,765 | 4/1972 | Nakagawa | 277/81 |
| 3,765,689 | 10/1973 | Adams | 277/26 |
| 3,972,536 | 8/1976 | Warner et al. | 277/83 |
| 4,079,947 | 3/1978 | Morris | 277/13 |
| 4,371,173 | 2/1983 | Kotzur | 277/12 |
| 4,415,164 | 11/1983 | Johnson | 277/1 |
| 4,538,820 | 9/1985 | Duffee | 277/11 |

Primary Examiner—Donald A. Griffin

[57] ABSTRACT

Self-aligning stationary composite adapted for use in a sealing assembly for pumps, and other machinery including rotary shafts, which includes a pair of rings, non-rotatably disposed in coaxial, colinear relation in an annular recess of a cylindrical gland, mechanically secured to the pump housing. The first ring of the composite, which is seated against the inner wall of the gland recess, has a U-shaped annular cavity filled with viscous liquid, which telescopically accommodates the inwardly-directed annular projection of the second ring of the composite. The annular outer face of the second ring provides a smooth surface against which the rotor attached to the shaft bears in sealing relation during rotation. The viscous liquid interposed into the U-shaped cavity, which may be silicone jelly, permits relative adjustment in an axial direction between the rings during rotation of the shaft, to compensate for misalignment between the rotating and the non-rotating parts.

16 Claims, 3 Drawing Sheets

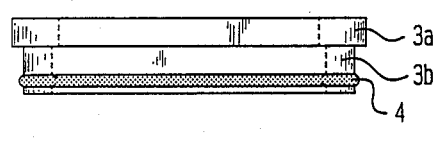
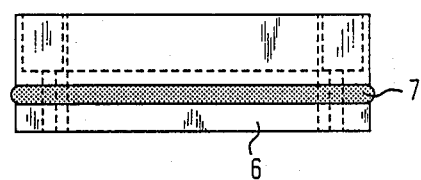
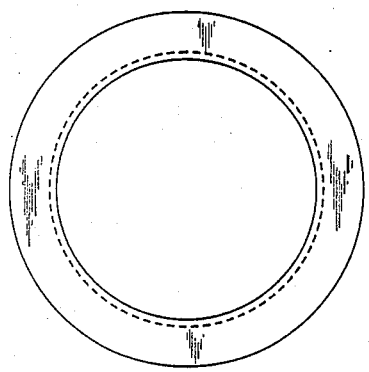
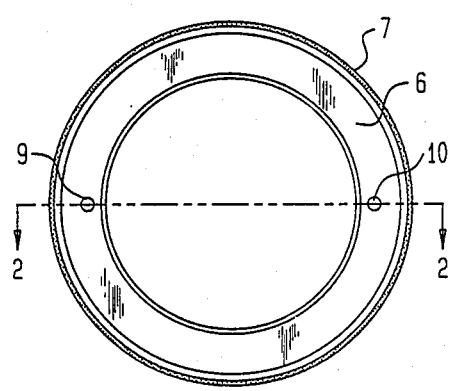

SELF-ALIGNING SEALING MEANS FOR PUMPS AND OTHER MACHINERY, INCLUDING ROTATING SHAFTS

BACKGROUND OF THE INVENTION

This relates in general to mechanical seals between fixed and rotating bodies, and more particularly to self-aligning pump seals.

In pumps and other types of machinery in which it is necessary to provide a seal between a rotating shaft and non-rotating portions of the housing in which the shaft rotates, problems arise because of inital structural imperfections, uneven junctions and wear and tear on structural parts, all of which tend to cause constant misalignment between the non-rotating and rotating elements.

Various methods of solving these problems have been proposed and implemented in the prior art by providing for relative motion in an axial direction between a non-rotating ring, which is constantly floating or self-adjusting, relative to a rotating member fixed to the rotating shaft. These prior art self-adjusting means have taken various forms, such as providing spring-bias between the non-rotating and rotating elements, or interposing a resilient ring, or a flexible metal ring, between the non-rotating and rotating members. None of these devices has been found to be fully satisfactory in providing constant full-face, fully lubricated contact between the rotating and non-rotating members. Thus, initial maladjustments, and wear between the parts is not fully compensated by these prior art devices, thereby causing leakage around the seal and requiring constant replacement of the parts.

Accordingly, it is the principal object of this invention to improve the sealing means between non-rotating and rotating elements in pumps and other types of rotating machinery, more particularly by providing self-adjusting means which are not subject to constant readjustment or replacement. Other objects of the invention are to provide self-adjustment and/or self-alignment means for the stationaries of pump seals and the like which are simpler, more effective, and less expensive to install and maintain than those available in the prior art.

These and other objects are achieved in accordance with the present invention in an improved seal assembly, more specifically, comprising improvements in the stationary composite of the seal assembly, which comprises a pair of rings disposed in coaxial, colinear relation, adapted for installation in an annular recess in a cylindrical gland, or other element secured to the housing in which a pump shaft or other rotatable device is journaled to rotate. The composite stationary comprises a first metal ring, which is seated against the inner wall of the gland recess, and held in place in the recess by a peripherally-disposed O-ring, and has a U-shaped cavity filled with viscous liquid which accommodates telescopically an inwardly-directed annular stub of a second ring. The latter is directed in an axial direction to project into, and form, with O-ring contacts, inner and outer seals against the walls of the U-shaped annular cavity of the first metal ring. An anti-rotational pin may be provided to prevent rotation between the first and second rings. The annular outer face of the second ring, which is normal to the axis of the shaft, provides a smooth surface against which the rotor attached to the shaft bears in sealing relation during rotation. Viscous liquid interposed into the U-shaped cavity of the first ring acts as a buffer, permitting the first ring to float, constantly adjusting its position in an axial direction as the shaft rotates.

A particular feature of the invention is that the liquid, which may be, for example, silicone jelly, is easily injected into or removed from the annular cavity of the first ring through small bores, which are readily sealed up. The liquid may either be interposed freely into the annular cavity, or it may be enclosed in a flexible toroidal tube which is interposed when the rings are assembled to form the cavity.

These and other objects, features and advantages of this invention are better understood by a study of the detailed description hereinafter with reference to the drawings.

SHORT DESCRIPTION OF THE DRAWINGS

FIG. 4 is a side-elevational showing of the second annular ring.

FIG. 5 is a side-elevational showing of the first annular ring.

FIGS. 6 and 7 are, respectively, top and bottom views of the assembled rings of the stationary composite of the seal assembly.

DETAILED DESCRIPTION OF THE INVENTION

Figure 1:
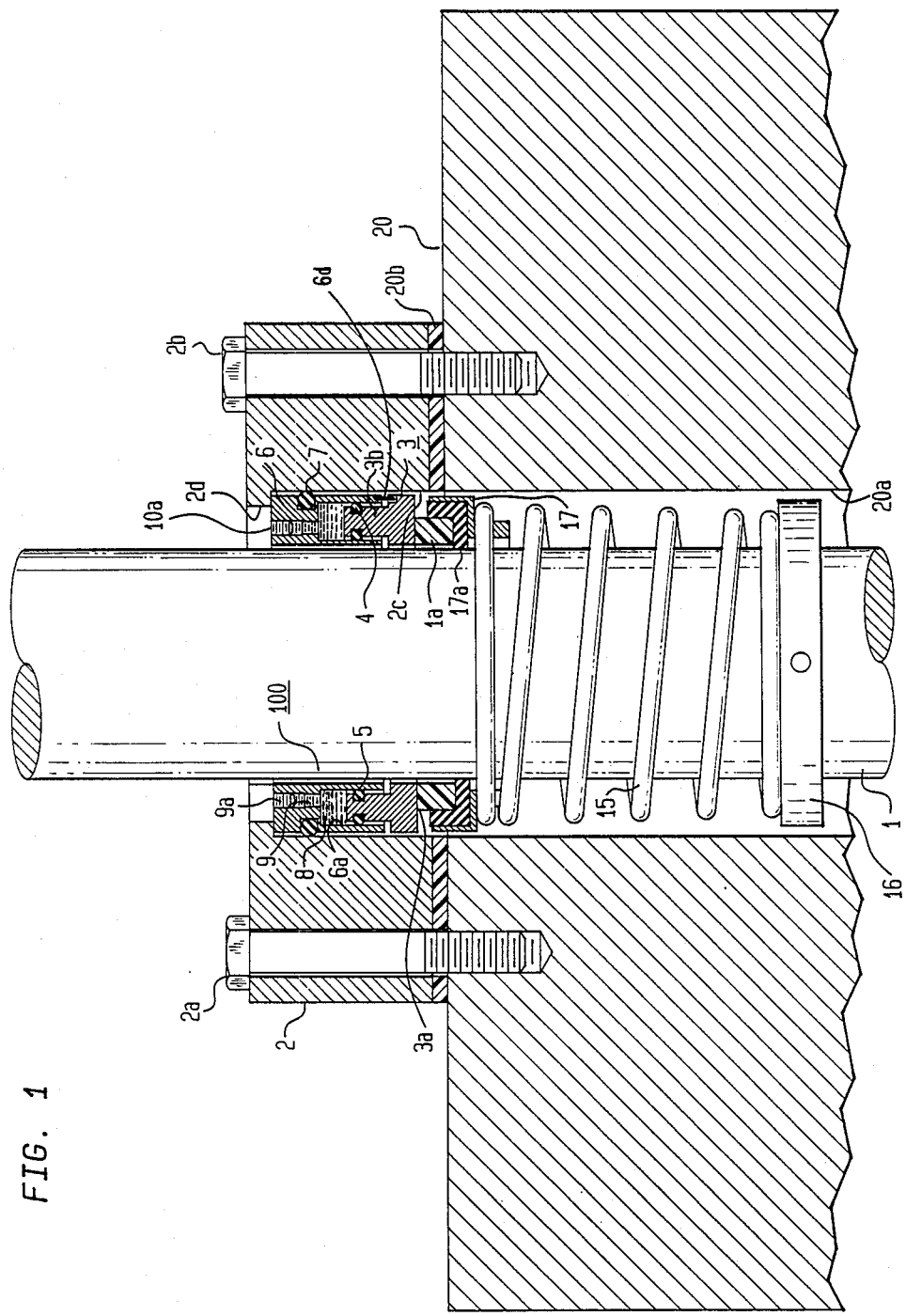
FIG. 1 shows, in diametrical section, a cylindrical gland mechanically secured to a pump housing, in an annular cavity of which is enclosed the self-aligning pump seal assembly including the stationary composite of the present invention, disposed to surround the shaft during rotation.

Referring to FIG. 1 of the drawings, there is shown, in diametrical section, a pump shaft assembly which includes a fixed pump housing member 20, in a central bore 20a in which a pump shaft 1 is journaled to rotate. The pump shaft 1 is driven to rotate by conventional pump driving means, not shown.

The pump shaft 1, which, in the present example, is 1-⅜ inches in diameter, has an annular rotor 1a, which has an outer diameter of 2-7/16 inches, and an inner diameter of 1-11/16 inches, is 9/16 inch in axial thickness, and is fixed to the periphery of pump shaft 1a to rotate therewith.

The rotor 1a is held under compression by a conventional coil spring 15, which surrounds the shaft 1, on which it is secured in place by the backup ring 16 connected to one of its ends. The position of the ring 16 may be readily moved forward or back, and secured at a desired place along the shaft 1 in order to regulate the amount of compression it produces. The other end of coil spring 15 bears against the annular steel collar 17 having an inwardly-directed L-shaped annular section which accommodates a rubber grommet 17a. The latter has an annular L-shaped section, the inner peripheral edge of which makes sealing contact against the rotating shaft, and the inner surface of which, normal to the shaft axis, bears in rotation against the exposed face of the rotor 1a, transmitting pressure to stationary composite 100 of the present invention, which will now be described in detail.

The stationary composite 100 of the present invention is held in place in an annular recess of gland 2 with its inner bore enclosing the shaft 1, which is journaled to rotate in relation to the stationary composite 100. The gland 2, which is of general cylindrical form, for example, 5-⅝ inches in outer diameter, 1-⅜ inches thick in an axial direction, and is fixed to the outer face of the pump housing 20, being pressed against an elastomer gasket 20b, by a pair of bolts 2a, 2b space-apart diametrically, so that gland 2 and the gasket 20b are disposed to accommodate the shaft 1.

Adjacent the interface with pump housing 20, the gland 2 has an inner diameter 1-½ inches, forming a chamber which extends about ⅝ inch in an axial direction to an internal shoulder, where the inner diameter is stepped back to 2-⅛ inches, extending therefrom about ¾ inch in axial depth.

Figure 2:
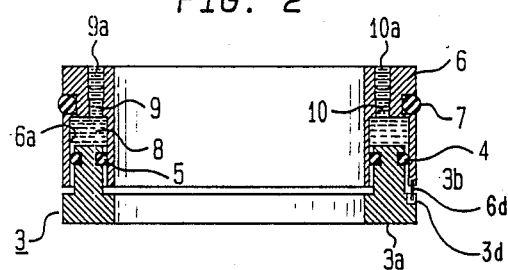
FIG. 2 shows a diametrical section of the self-aligning stationary composite of the pump seal assembly of FIG. 1, removed from the shaft, and rotated through 90 degrees.
Figure 3:
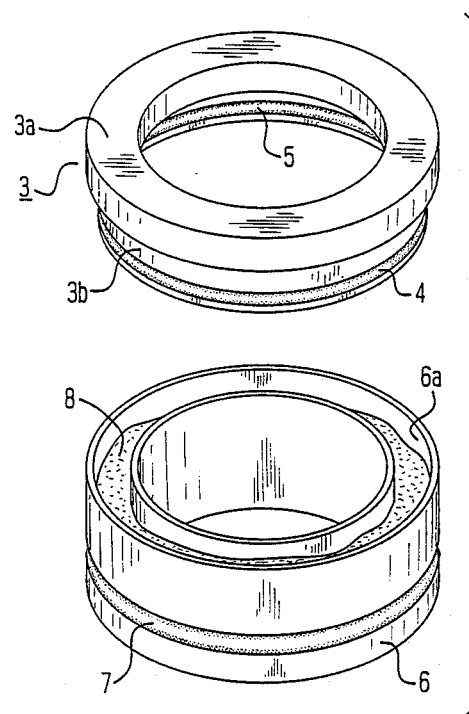
FIG. 3 is an exploded view, in perspective, of the stationary composite of the seal assembly of FIGS. 1 and 2 with the second annular ring removed from the annular cavity of the first annular ring to show the interior.

The stationary composite 100 comprises two annular sections, as shown in FIGS. 2 and 3. A first ring 6, of U-shaped cross-section, is held in place in the inner end of the cavity 2c against the shoulder 2d, and the second ring 3 has an inwardly projecting ring 3b which fits telescopically into the U-shaped cavity of ring 6.

In the example under description, the first ring 6, as shown in FIGS. 5 and 7, which is formed of stainless steel or similar material, is 2-5/16 inches in outer diameter, 1-⅝ inches in inner diameter, and extends ¾ inch in overall length in a direction parallel to the axis, being recessed about 3/16 inch from the outer end. Centered about ¼ inch in from the shoulder 2d is an annular notch which accommodates an O-ring 7, of neoprene or the like, 1/16 inch in cross-section, which holds ring 6 in fixed relation against the inner walls of the cavity 2c of gland 2.

First ring 6 has an annular cavity 6a, of U-shaped cross-section, which opens towards the center of the stationary composite 100, and has a maximum diameter of 2-5/16 inches and a minimum diameter of 1-¾ inches, and extends 5/16 inch deep in a direction parallel to the axis. A pair of small bores 9 and 10, parallel to the axis, each, say, 1/16 inch in diameter, are interposed in diametrically-opposite positions, connecting the interior of the cavity 6a with the outer annular surface of member 6. Means, such as small screws 9a, 10a, are provided for closing these openings.

The second ring 3, as shown in FIGS. 4 and 6, is formed of stainless steel, or alternatively, of tungsten carbide, silicone carbide, or a material designated by the trademark STELLITE, a ceramic material or any material of similar wear-resistant characteristics. In the example under description, it is annular in shape, the head portion 3a having an outer diameter of 2-5/16 inches and an inner diameter of 1-⅝ inches, and a thickness of 3/16 inch. The inwardly-projecting annular stub 3b is stepped back to a peripheral diameter of 2-3/16 inches, an inner diameter of 1-¾ inches, and projects ⅜ inch in an axial direction toward the center of the seal. 1/16 inch in an axial direction from the inner annular surface of 3b are a pair of annular lateral notches, back-to-back, one on the external surface facing outward, and the other on the internal surface facing toward the axis, which are respectively constructed to accommodate the O-rings 4 and 5, of elastomer, such as, neoprene, or other synthetic rubbers which O-rings are, say 1/16 inch in cross-section.

The smooth polished annular steel surface of head portion 3a, which is 5/16 inch wide in the present embodiment, is recessed ⅛ inch from the inner flat surface of the gland 2. Surface of head portion 3a acts as a bearing surface for contact by rotor 1a as shaft 1 rotates.

The inwardly-projecting annular stub 3b is constructed to be accommodated telescopically against the internal walls of the annular cavity 6a of the ring 6, the O-rings 4 and 5 making sealing contact against the cavity walls as ring 3 aligns itself in an axial direction relative to the principal axis of rotating shaft 1.

Figure 2B:
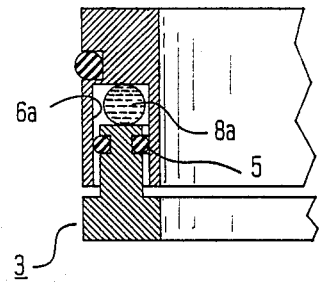
FIG. 2B is a fragmentary showing of a modification of the stationary composite of FIG. 2 in which the liquid is enclosed in a flexible toroidal tube.
Figure 2A:
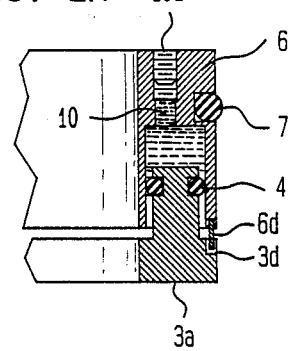
FIG. 2A shows an enlargement of a fragmentary showing including an anti-rotational pin interposed between the rings of the stationary composite of the pump seal assembly shown in FIGS. 1 and 2.

As shown in FIG. 2A, to prevent rotation between rings 3 and 6, a small pin 6d is interposed into the end wall of the ring 6. This is accommodated in a slot 3d on the shoulder of ring 3.

A particular feature of the present invention is that the cavity 6a is filled with liquid 8, which may be applied through bores 9 and 10, which are then closed with screws 9a, 10a, and which may be further secured by epoxy or similar means. In the example under description, the liquid 8 may take the form of silicone jelly, or mineral oil. Other liquids which may be used for this purpose are SAE #10 oil, SAE #30 oil, glycerine, SAE #50 oil. A preferred volume of liquid 8 for present purposes is one cubic centimeters, although it has been found that any quantity within the range one to one and one-half cubic centimeters for an embodiment dimensioned in accordance with the present description, is operative for the puroses of this invention.

The liquid 8, as used for the stationary composite of the presently described sealing assembly, should be of a type which is not chemically reactive with the metal elements of the seal, and is characterized by a viscosity falling within a range, say, 1 to 1500 centipoises. (Poises are defined as dyne-seconds/cm.)

It will be understood that the liquid 8, instead of being free flowing in the cavity, may, for convenience of application, be enclosed in an annular toroidal sack 8a of flexible material such as plastic or rubber, as indicated in the enlarged fragmental showing, FIG. 2B.

When the stationary composite of the present invention is in fully assembled operation in the sealing assembly, the liquid 8 serves to constantly adjust the position of the non-rotating ring 3, causing it to move in an angular direction with reference to the axis, correcting for misalignment, which may be apparent upon installation of the stationary composite or as a result of substantial wear of the rotating parts. The O-rings 5 and 6 make sealing contact to the inner walls of the cavity 6a, closing the latter so that the liquid 8 cannot leak out. As explained heretofor, rotation of the members 3 and 6 relative to one another is prevented by interposing a pin 6d between the inner edge of the member 6 and a notch 3d in the corresponding edge of member 3, as illustrated in FIG. 2A.

It will be understood that the principles of the present invention, as disclosed and claimed herein, may be adapted to other types of machinery than pumps, in which alignment between fixed and rotating elements are a problem.

The invention is not limited to the specific mechanical structures and the particular dimensions described herein by way of example, but only by the scope of the appended claims.

What is claimed is:

1. A self-aligning annular stationary composite of a sealing assembly constructed to be interposed between rotatable members including a rotor projecting from a rotatable shaft, and non-rotatable members including an enclosure rigidly coupled to the housing in which said shaft is journaled to rotate, said annular composite comprising in combination:

a first cylindrical annular ring constructed to seat in said enclosure in coaxial relation to said shaft, said first ring comprising an annular cavity directed inwardly in an axial direction towards the center of said stationary composite;

a second cylindrical ring comprising an annular head portion having a smooth annular outwardly-directed surface in a plane normal to the principal axial of said stationary composite, constructed to provide a bearing surface for said rotor during rotation of said shaft, and an annular stub, integral with said head portion, which projects inwardly in an axial direction in said cavity toward the center of said stationary composite from said head portion;

the annular stub of said second ring comprising means for holding said stub in contact with the opposite inner walls of said cavity in sealing relation for closing said cavity;

means for interposing a liquid into said cavity to act as a buffer during the rotation of said shaft, and to facilitate adjustment in an axial direction between said first and second rings during said rotation to compensate for misalignment between said rotatable and non-rotatable members.

2. The combination in accordance with claim 1 wherein said means for holding said stub in contact with the opposite inner walls of said cavity comprises a pair of O-rings, one O-ring being seated on the outer periphery of said annular stub, and the outer O-ring on the inner periphery of said annular stub, wherein said O-rings form a sealing contacting reltionship with the inner walls of said cavity.

3. The combination in accordance with claim 1 wherein said means for holding said stub in contact with the opposite inner walls of said cavity comprises a pin in said stub which engages a slot in a wall of said cavity or visa versa.

4. The combination in accordance with claim 1 wherein the annular head portion of said second ring has outer and inner diameters which are respectively substantially equal to the outer and inner diameters of said first ring.

5. The combination in accordance with claim 4 wherein said first annular ring includes an O-ring seated around its outer periphery in a plane between the inner annular base of said cavity and the outer face of said first ring.

6. The combination in accordance with claim 1 wherein a liquid is interposed in said cavity.

7. The combination in accordance with claim 6 wherein said liquid is enclosed in an annular tubular container of flexible material.

8. The combination in accordance with claim 6 wherein said liquid is characterized by a viscosity within the range 1 to 1500 centipoises.

9. The combination in accordance with claim 8 wherein said liquid is silicone gel.

10. The combination in accordance with claim 8 wherein said liquid is oil.

11. An annular stationary composite of a sealing assembly constructed to be interposed between a rotor fastened to a rotatable pump shaft and non-rotatable elements rigidly coupled to the pump housing, said annular stationary composite comprising in combination:

a first cylindrical annular ring comprising an annular cavity of U-shaped cross-section directed inwardly in an axial direction toward the center of said stationary composite;

a second cylindrical ring comprising an annular head portion having an outer diameter which substantially equals the outer diameter of said first cylindrical ring, and having a smooth annular outwardly-directed surface in a plane normal to the principal axis of said stationary composite, constructed to provide a bearing surface for said rotor during the rotation of said shaft, and an annular stub integral with said head portion, coaxail with, and of smaller diameter than said head portion, which is directed inwardly in an axial direction toward the center of the stationary composite from said head portion, and is dimensioned to be accommodated in telescopic relation within the U-shaped cavity of said first annular ring;

the annular stub of said second ring comprising a pair of O-rings disposed on opposite sides of the inner and outer walls of said stub and disposed to ride telescopically in and close said cavity in sealing relation to the inner walls of said cavity during rotation of said shaft.

12. The combination in accordance with claim 11 wherein a toroidal tube is interposed in said cavity, said tube being filled with a quantity of liquid having a viscosity within the range 1 to 1500 centipoises.

13. A self-aligning annular stationary composite of a sealing assembly constructed to be interposed between a rotor fastened to a rotatable pump shaft and non-rotatable elements rigidly coupled to the pump housing, said self-aligning annular stationary composite comprising in combination:

a first cylindrical annular ring comprising an annular cavity of U-shaped cross-section directed inwardly in an axial direction toward the center of said stationary composite;

a second cylindrical ring comprising an annular head portion having an outer diameter which substantially equals the outer diameter of said first cylindrical ring, and having a smooth annular outwardly-directed surface in a plane normal to the principal axis of said stationary composite, constructed to provide a bearing surface for said rotor during the rotation of said shaft, and an annular stub integral with said head portion, coaxial with, and of smaller diameter than said head portion, which is directed inwardly in an axial direction toward the center of the stationary composite from said head portion, and is dimensioned to be accommodated in telescopic relation within the U-shaped cavity of said first annular ring;

the annular stub of said second ring comprising a pair of O-rings disposed on opposite sides of the inner and outer walls of said stub and disposed to ride telescopically in and close said cavity in sealing relation to the inner walls of said cavity during rotation of said shaft;

which includes means comprising at least one bore hole connecting said cavity with the outer annular surface of said first ring for interposing liquid through said at least one bore hole into said cavity and subsequently sealing said at least one bore hole.

14. The combination in accordance with claim 13 wherein said cavity is filled with a quantity of liquid having viscosity within the range 1 to 1500 centipoises.

15. The combination in accordance with claim 14 wherein said liquid is silicone jelly.

16. The combination in accordance with claim 14 wherein said liquid is oil.

* * * * *